United States Patent Office 2,694,714
Patented Nov. 16, 1954

2,694,714

FAST BASES OF THE QUINOLINE SERIES

Frederick Brody, New York, N. Y., assignor to American Cyanamid Company, New York, N. Y., a corporation of Maine No Drawing. Application March 1, 1952, Serial No. 274,489

4 Claims. (Cl. 260—287)

The present invention relates to compounds of the formula

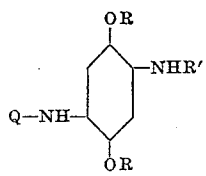

in which Q is a 2-quinoline radical, R' is selected from the group consisting of hydrogen and $R_2CO$ and R and $R_2$ are lower alkyl.

The production of azoic coloring matters of a greenish-blue shade has presented a considerable problem in the past, as most blue azo coloring matters do not have this desirable shade, or if they do have, have other undesirable characteristics, such as inadequate fastness, high cost, etc. Compounds of the present invention in the form of their free bases, that is to say, where R' is hydrogen, can be diazotized and coupled with ordinary azoic coupling components. When they are coupled with 2-hydroxy-3-naphthoic acid arylides, they yield blue azo dyestuffs of good fastness properties and desirable greenish shade.

While in its broader aspects the present invention includes compounds in which Q is quinoline or its homologs, the compound of greatest practical interest is the 4-methyl derivative which has the formula

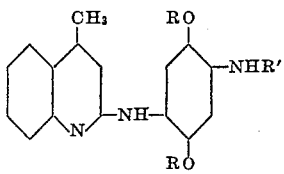

While the present invention is not limited to any particular method of preparing the compounds, I have found that a simple method is the condensation of a 2,5-dialkoxy-4-amino acylanilide, such as 2,5-dialkoxy-4-aminoacetanilide, with a 2-chloroquinoline, such as 2-chlorolepidine. The acyl amino compounds are readily hydrolyzed to the free base by known methods. The acyl group can be any lower acyl group, such as acetyl, propionyl, etc., but because of lower price and ready availability, 2,5-dialkoxy-4-aminoacetanilides are preferred. The lower alkyl group represented by R in the formula may be any of the typical lower alkyls, such as ethyl, methyl, propyl, etc.

The free bases of the present invention are diazotized smoothly and coupled with ordinary coupling components, either to prepare pigments or to dye goods by padding the coupling component thereon and developing, or by forming stable derivatives of the diazo compounds, such as diazoamino compounds which can be incorporated in printing pastes and developed on the fiber by acid development. Among the coupling components which may be used are such compounds as beta-naphthol, 8-amino-2-naphthol, 8-acetylamino-2-naphthol, benzyl naphthols, pyrazolones and pyrazyl pyrazolones, hydroxybenzofluorenones and various N-substituted amides such as arylides of 2-hydroxy-3-naphthoic acid, of 2-hydroxy-3-anthroic acid, of methyl and dimethylsalicylic acids, of hydroxycarbazole carboxylic acids, of hydroxybenzocarbazole carboxylic acids, of hydroxybenzothiophene carboxylic acids, of acetoacetic acid, of benzoylacetic acid and the like.

This invention is further illustrated by the following examples. Where not otherwise noted, parts are by weight.

Example 1

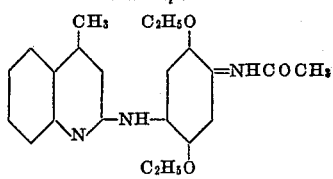

A mixture of 7.14 parts of 2,5-diethoxy-4-aminoacetanilide, 5.33 parts of 2-chlorolepidine and 3 parts of N hydrochloric acid in 80 parts of 50% dioxane-water is refluxed until condensation is complete and then drowned in water. The product is filtered and may be recrystallized from alcohol or from a mixture of dioxane and ethyl acetate. It is the hydrochloride of the compound of the above formula. It is readily converted by ordinary methods to the free base, which may be recrystallized from alcohol.

Example 2

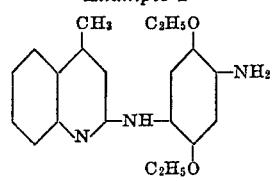

A mixture of 1.79 parts of the hydrochloride of Example 1 with 8 parts of concentrated hydrochloric acid in 20 parts of ethanol is refluxed to effect hydrolysis. The mixture is cooled and filtered and the white product neutralized with sodium hydroxide solution. The base may be recrystallized from aqueous ethanol or aqueous methanol.

Example 3

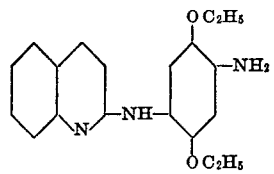

The procedure of Examples 1 and 2 is followed, replacing the 2-chlorolepidine with 2-chloroquinoline. The reaction proceeds smoothly and good yields of the compound are obtained.

I claim:

1. A compound of the formula

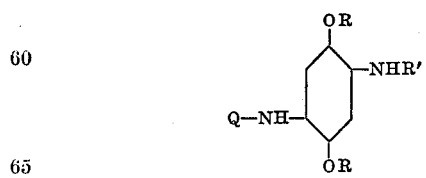

in which Q is a radical selected from the group consisting of 2-quinoline and its homologues, R' is selected from the group consisting of H and $R_2CO$ and R and $R_2$ are lower alkyl.

2. A compound according to claim 1 in which the 2-quinoline radical is 2-lepidine.

3. A compound of the formula

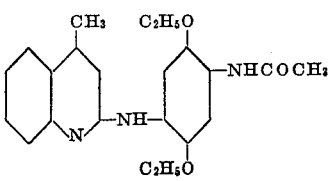

4. A compound of the formula
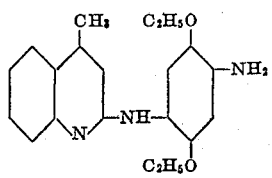
References Cited in the file of this patent
UNITED STATES PATENTS
| Number | Name | Date |
|---|---|---|
| 1,810,267 | Desamiri | June 16, 1931 |
| 2,148,910 | Mietzsch et al. | Feb. 28, 1939 |
| 2,472,066 | Curd et al. | June 7, 1949 |